United States Patent [19]

Stanziola

[11] Patent Number: 5,012,431

[45] Date of Patent: Apr. 30, 1991

[54] OBJECTIVE COLOR NOTATION SYSTEM

[75] Inventor: Ralph Stanziola, Neshanic Station, N.J.

[73] Assignee: Colwell/General, Inc., Minneapolis, Minn.

[21] Appl. No.: 476,122

[22] Filed: Feb. 2, 1990

Related U.S. Application Data

[63] Continuation of Ser. No. 175,519, Mar. 31, 1988, abandoned.

[51] Int. Cl.$^5$ .............................................. G01J 3/46
[52] U.S. Cl. ................................... 364/526; 356/405; 356/425
[58] Field of Search ................. 364/526; 356/402, 403, 356/405, 406, 407, 408, 421, 425

[56] References Cited

U.S. PATENT DOCUMENTS

| | | | |
|---|---|---|---|
| 2,522,723 | 9/1950 | Rookyard | 434/102 |
| 2,606,373 | 8/1952 | Lamberger | 434/101 |
| 3,101,558 | 8/1963 | Young | 434/101 |
| 3,231,990 | 2/1966 | Mosbacher | 434/101 |
| 3,601,589 | 8/1971 | McCarthy | 235/150 |
| 4,048,493 | 9/1977 | Lee | 250/205 |
| 4,310,314 | 1/1982 | Worn et al. | 434/101 |
| 4,620,792 | 11/1986 | Suga | 364/526 |
| 4,685,071 | 8/1987 | Lee | 364/526 |
| 4,688,178 | 8/1987 | Connelly et al. | 364/526 |
| 4,689,669 | 10/1987 | Hoshino et al. | 364/526 |
| 4,770,534 | 9/1988 | Matsuki et al. | 356/405 |
| 4,813,000 | 3/1989 | Wyman et al. | 364/526 |
| 4,884,221 | 11/1989 | Sugiyama et al. | 364/526 |

FOREIGN PATENT DOCUMENTS

8604987 8/1986 France .
62-142242 6/1987 Japan .
2192455 1/1988 United Kingdom .

OTHER PUBLICATIONS

F. W. Billmeyer, Jr. et al.: "Survey of Color Order Systems", pp. 173–186, Color Research & Application (New York) vol. 12, No. 4, Aug. 1987.

*Primary Examiner*—Parshotam S. Lall
*Assistant Examiner*—Brian M. Mattson
*Attorney, Agent, or Firm*—Merchant, Gould, Smith, Edell, Welter & Schmidt

[57] ABSTRACT

A method for generating the characteristics of a set of colors involves selecting at least two, and typically more reference colors. Each of the selected reference colors is described by a set of color characteristic data indicating the reflectance of each color at each of a set of predetermined wavelengths; and descriptions of the intermediate color samples are generated by computer the relative proportions of each base color which characterizes each intermediate color and calculating a reflectance value at each wavelength for the color to be generated proportionate to the reflectance values for each base color at the corresponding wavelength. A set of color samples is created as a result of the method for generating the characteristics of the colors and arranged in a geometry indicative of the method. A system for generating the color samples data has storage for storing the photometric characteristics and other data; a central processor under software control for accessing the stored data, computing the relative proportion of each reference color comprising each color to be generated, and computing the reflectances at each wavelength for which color reflectance data is stored for each intermediate color; and an output for outputting the data generated by the central processor.

21 Claims, 4 Drawing Sheets

OBJECTIVE COLOR NOTATION SYSTEM

This is a continuation of application Ser. No. 07/175,519, filed Mar. 31, 1988 now abandoned.

FIELD OF THE INVENTION

This invention relates to color description and notation systems, in particular a system which describes and notates a set of colors whose characteristics are derived from weighting the characteristics of a set of reference colors.

BACKGROUND

The appearance of a colored object is affected by three primary factors: the photometric characteristics of the light source which illuminates the color, the photometric characteristics of the colored object, and the perception of these characteristics by an observer. Additional factors such as texture, gloss, etc. may affect how a color is perceived by an observer, but have varying affects on the spectrophotometric characteristics of that color.

Colorimetric systems have been developed in an effort to objectively describe how colors are perceived by observers. The International Commission on Illumination (CIE) has, for example, developed a system for objective description of color by light source, object, and observer. The CIE developed a standardization of the illuminant and observer data. The color of the object under these standard conditions is identified by tristimulus values X,Y and Z. Each XYZ value is obtained by multiplying the reflectance of the colored sample, the power of the standard illuminant, and the calculated amount of each of the three primary colors (red, green, and blue) which, when combined, are found through observational tests to be the color equivalent of the object being described.

The tristimulus values X,Y, and Z are of somewhat limited value as color specifications because they do not correlate well to visual attributes. As a result, the CIE adopted the use of chromaticity coordinates x, y, and z which are the amounts of each tristimulus value divided by the sum of all three.

The CIE chromaticity calculations have been further transformed by the use of the L*a*b transformation. The L*a*b system identifies color by lightness or darkness as its L* value. The saturation, or amount of dullness or brightness (deviation from gray) a color has, as well as hue, or what is commonly called color (blue, green, etc.), are both identified using +a, +b values. The L*, a*, and b values may be used as coordinates to lay out the color system in a three-dimensional space. Typically, the L* value is shown in the vertical z-direction. The +a*, +b values are set in the XY plane. Plus a is red, −a* is green, +b is yellow, and −b is blue. L*=0 is black, and L*=100 is white. Between these extremes of each value, all colors can be identified. See FIG. 1.

In addition to the above-described color description systems, a number of other color order systems are commercially used to identify color samples and for other purposes. Among the most popular is the Munsell system. The Munsell system has a lightness value essentially corresponding to the L* value of the L*a*b system. Unlike the L*a*b system, hue and saturation are defined by a letter-number system corresponding to the hue and chroma characteristics of the color.

It would be desirable for a commercial color sample system to have several characteristics. Among them are that the system have representations and be layed out in a geometry which is generally consistent with the typical user's intuitions as to the components and relationships of the represented colors. Moreover, a system adapted to the L*a*b system would have advantages including ease of transformation between systems and ease of access in processing data available through the L*a*b system.

Colors subject to metamerism may have other types of characteristics which are identical. A system which only identifies colors as similar when there is no metamerism between the colors is desirable. A color sample system would be desirable that simplifies matching efforts between a sample color and a color to be manufactured from a given set of colorants identifying the color sample in a manner readily processible by a system which determines how to mix the available colorants. Ideally, such matching could be accurately achieved even for sample colors not identified in the system through an objective description of the color based on identified sample colors.

SUMMARY OF THE INVENTION

An objective color notation system is described including methods for generating the color sample characteristics of each color in the system, a processing system adapted to the methods, and a color system including samples derived by such a method.

A method for generating the characteristics of a set of colors in accordance with the present invention comprises the steps of selecting at least two, and typically more reference colors; describing each of the selected reference colors by a set of color characteristic data indicating the reflectance of each color at each of a set of predetermined wavelengths; and generating descriptions of the intermediate color samples by computing the relative proportions of each base color which characterizes each intermediate color and calculating a reflectance value at each wavelength for the color to be generated proportionate to the reflectance values for each base color at the corresponding wavelength. Also described is a set of color samples created as a result of the method for characteristics of the colors and arranged geometry indicative of the method.

A system for generating the color sample data in accordance with the present invention is described which comprises storage means for storing the photometric characteristics and other data; a central processing means under software control for accessing the stored data, computing the relative proportion of each reference color comprising each color to be generated, and computing the reflectances at each wavelength for which color reflectance data is stored for each intermediate color; and output means for outputting the data generated by the central processing means.

DESCRIPTION OF THE PREFERRED EMBODIMENT

The creation of a color system in accordance with the present invention is described herein, by way of example, through a two-dimensional plane in the L*a*b* system wherein L* is held constant. However, the principles described are adaptable to other systems and geometries, as will be clear.

Figure 2:
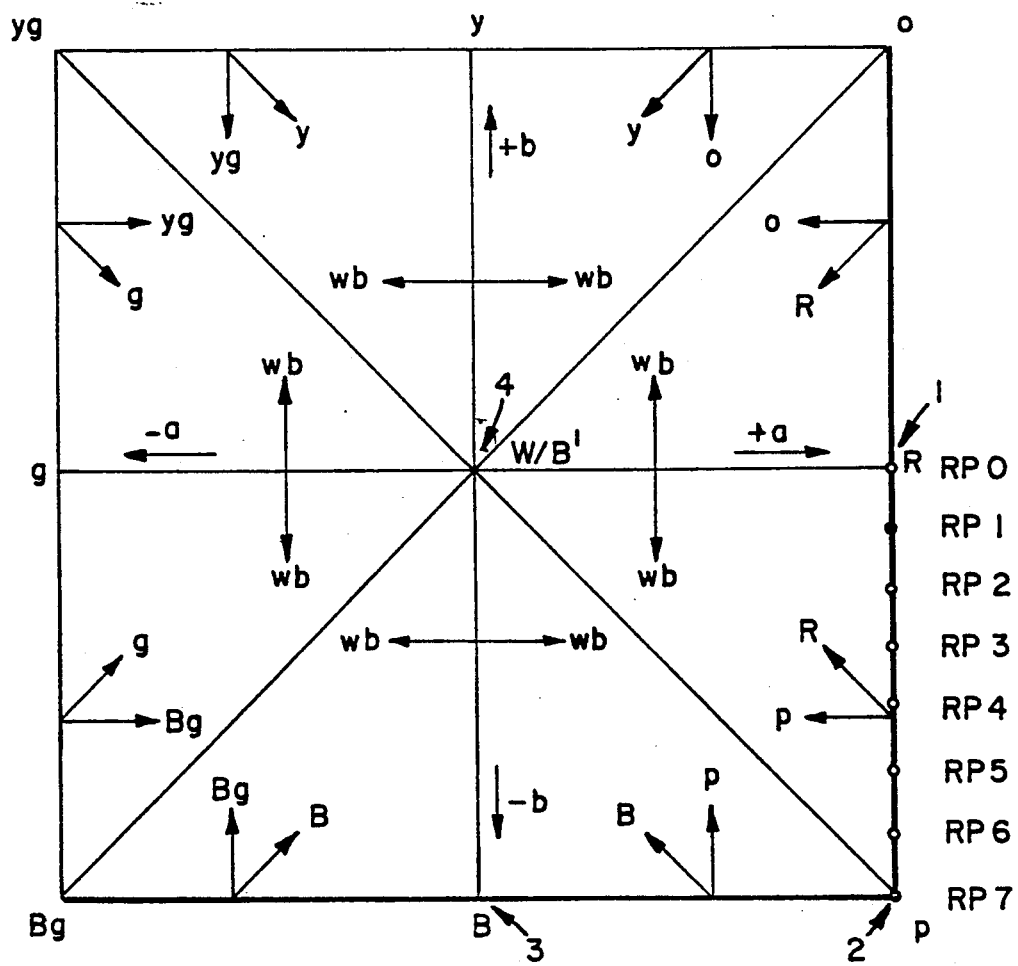
FIG. 2 is a graph representing a two-dimensional portion of the L*a*b chart with L* held constant.

FIG. 2 shows a grid in the L*a*b* geometry where L is a constant. The +a direction equates to a specific red (R), the −a direction to a specific green (g), the +b* direction to a specific yellow (y), and the −b* direction to a specific blue (B). Inbetween the +a and +b* axes are middle coordinates corresponding to the mixed colors orange (o), yellow-green (yg) blue-green (Bg), and purple (p). Along a line extending from the center of the map outward in any direction, the amount of saturation or grayness (white-black or wb) decreases. Thus, the amount of grayness is constant along the vectors (labeled wb in FIG. 2) perpendicular to lines extending from the center of the map. FIG. 2 also shows vectors for the various reference colors, labeled with the abbreviation for the pertinent reference color, which show lines along which the labeled color has a constant L* value and a constant proportion of the labeled color. For example, the line labeled R in the triangle formed by the points W/B', O, and R in FIG. 2 represents a line along which all represented colors have a proportion of the chosen Red color equal to 40%.

Figure 1:
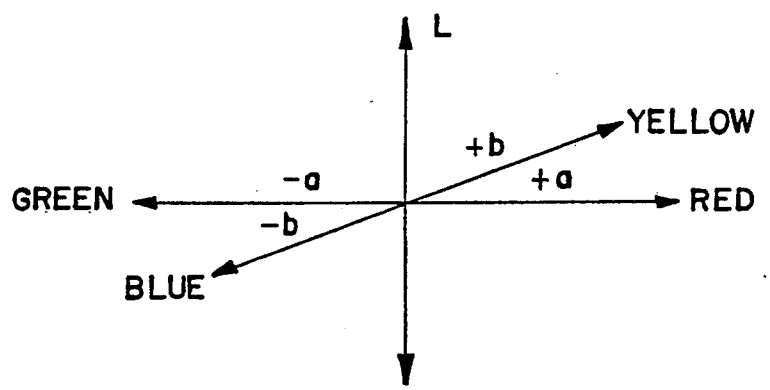
FIG. 1 is a graph representing the three-dimensional L*a*b color characteristics chart.

To generate the spectrophotometric and other characteristics of a set of color samples represented by a portion of the map shown in FIG. 2, a set of reference points are selected. For example, a quadrilateral-shaped region on the map shown in FIG. 1 may be created with four reference points. An example region described herein is bound by the points labeled 1, 2, 3, and 4, corresponding to the reference colors red, purple, blue, and gray. More or fewer reference points may be used to define the boundaries of the region represented by the map wherein color sample characteristics are to be generated. The reference points used may represent the reference colors represented by the abbreviations shown in FIG. 2, or by reference points which include combinations of the colors represented by these abbreviations.

The reference colors 1, 2, 3, and 4 are defined by their spectrophotometric characteristics. These characteristics are represented by numerical data representing the reflectance of each reference color at each of a selected group of wavelengths. Each reference color may also be characterized by tristimulus values and L*a*b* values. Other characteristic data may also describe the reference colors. Such data may be derived by evaluating a color sample matching the reference color. Alternatively, the reference color data may be obtained from sources of data representing the desired reference colors, and may or may not be based on an actual color sample.

With the data describing the color characteristics of each of the selected reference colors, the generation of data describing the color characteristics of a selected number of color samples is accomplished by processing the characteristics of the reference colors. A representative process and processing unit are described herein. As will be clear from the disclosure, systems equivalent to the present system may utilize a different sequence of steps in a different manner, yet reach the same result.

Figure 4:
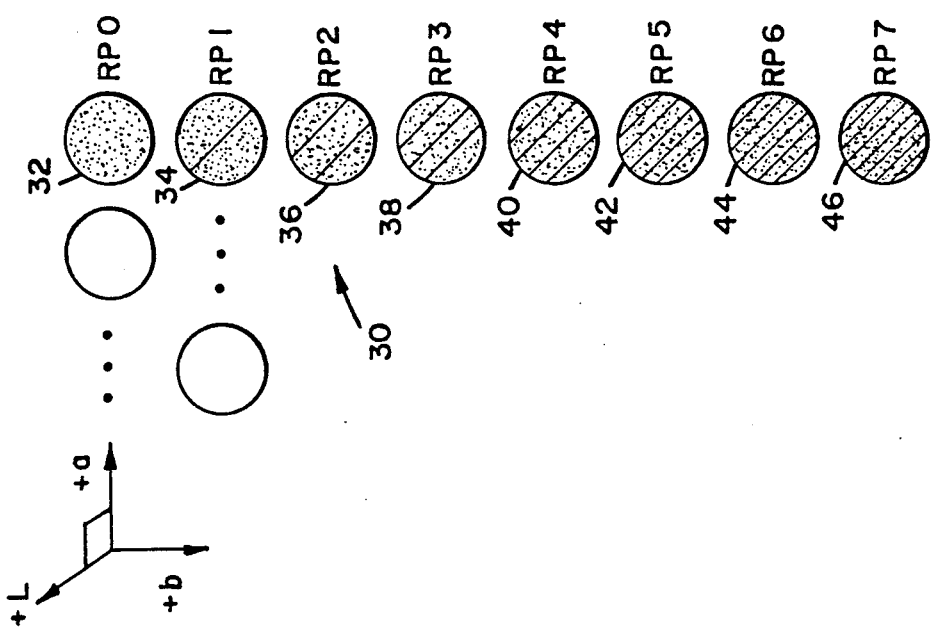
FIG. 4 is a drawing depicting a portion of a color chart generated in accordance with the present invention.

FIG. 4 shows a set of data generated between two reference colors: a color equivalent to one hundred percent of a specific red (designated RP0), and a color equivalent to one hundred percent of a specific purple (designated RP7). These two reference colors have no components of other hues, nor of gray. However, reference colors may be chosen having components of multiple colors. The data for these two reference colors serves as the starting point from which the data may be generated for the intermediate colors, designated RP1, RP2, . . . RP6. The locations of each of these colors is shown in FIG. 2 along a straight line extending from reference point 1 to reference point 2.

Figure 5A:
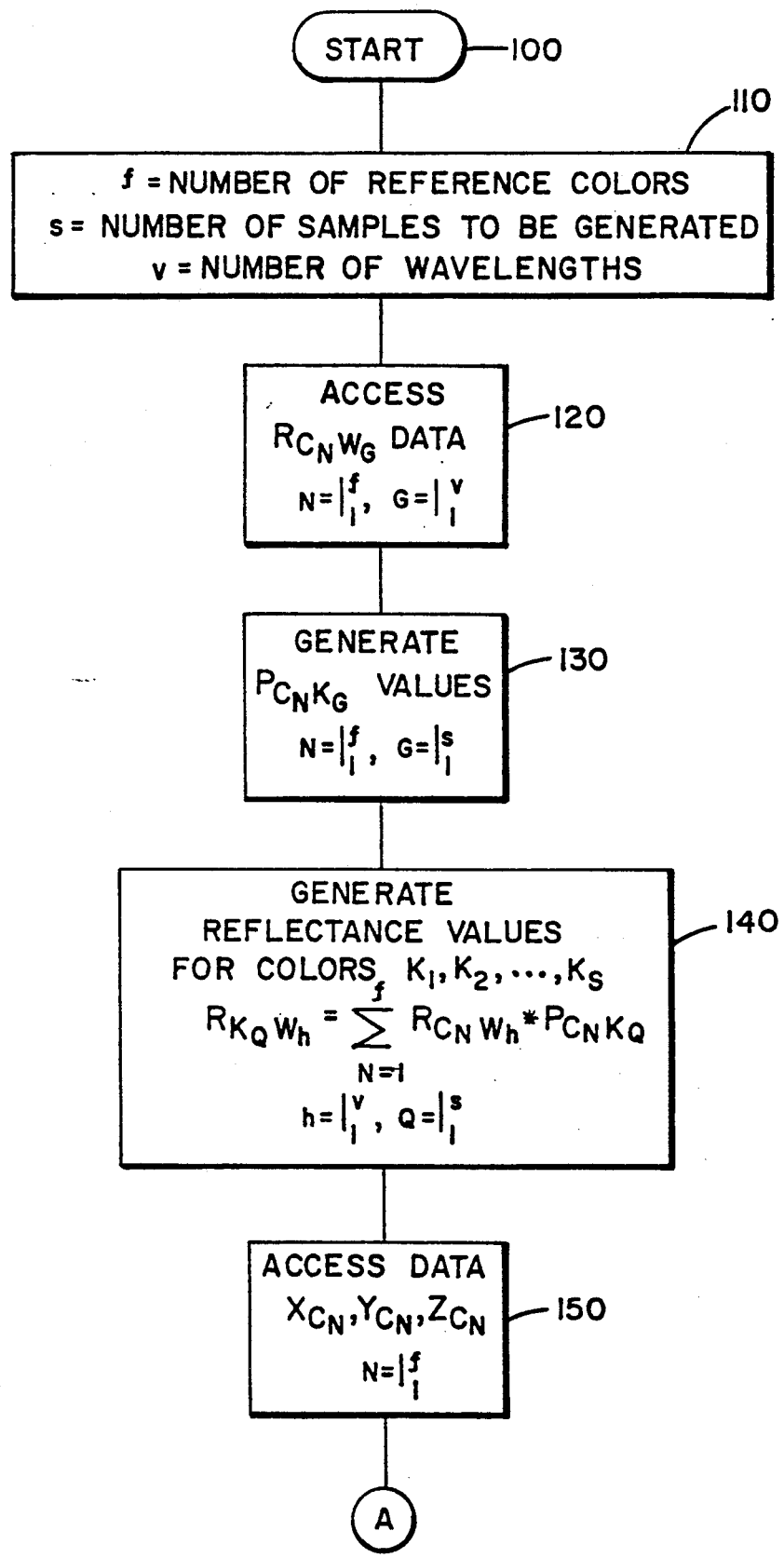
FIGS. 5A and 5B comprise a flow chart depicting the processing of color characteristic data in accordance with the present invention.

To generate the characteristics of the intermediate colors, the only initial data needed are the reflectance values for the reference colors (accessed at 120 in the flowchart shown in FIG. 5A), characteristics of the reference points RP0 and RP7 and the number of intermediate color samples to be characterized (accessed at 110 in FIG. 5A). In FIG. 4, by way of example, the number of intermediate colors chosen is 6.

Figure 3:
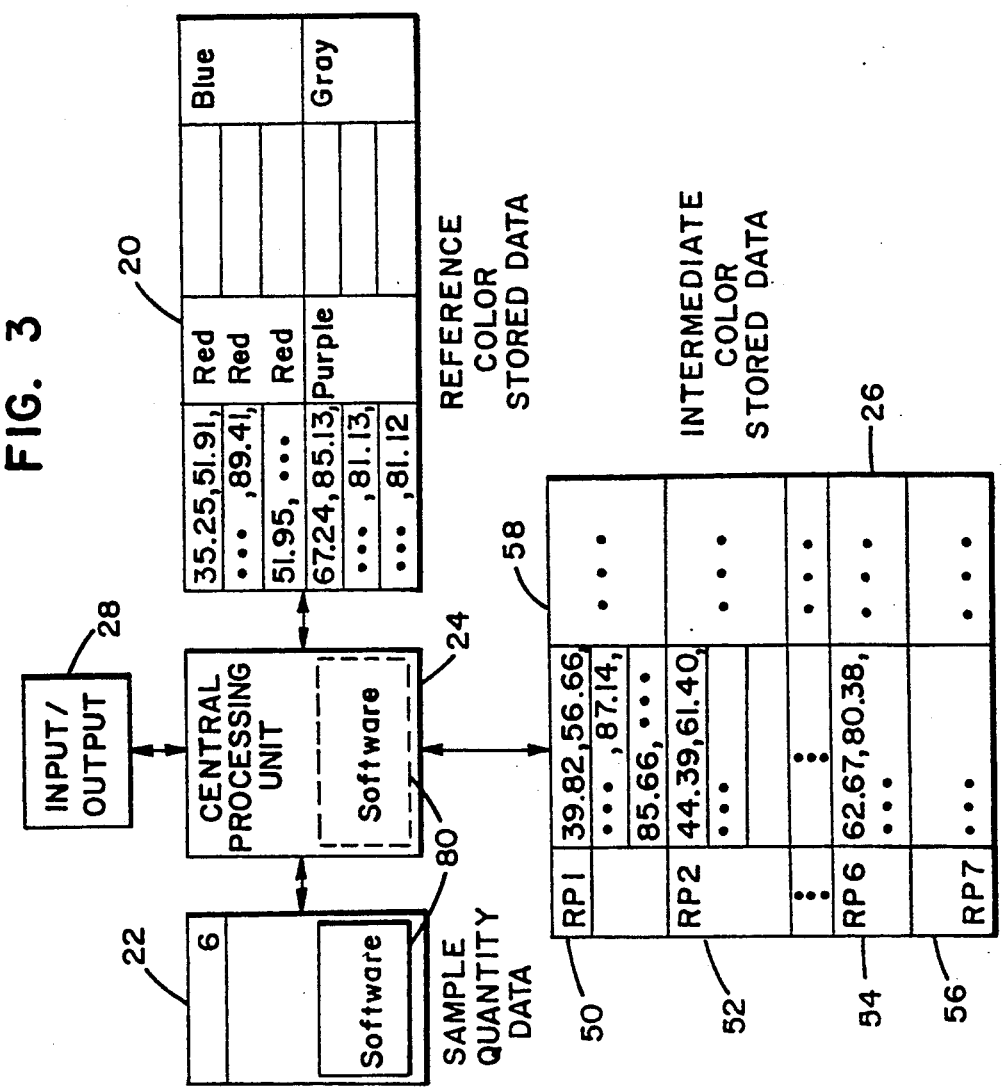
FIG. 3. is a block diagram of a processing system in accordance with the present invention.

The intermediate color characteristics are generated such that each of the samples has proportions of the reference colors RP0 and RP7 representative of the intermediate color sample's relative location between the reference points, or, equivalently, representative of the RP number 1–6 of the intermediate color. In FIG. 3, the proportion of red is shown as decreasing by a decimal representation of 1/7 (approximately 14.28%) for each successive sample, with the proportion of purple increasing by an amount equal to the amount of the decrease of the intermediate color's proportion of the red reference color. These calculations are made at step 130 of FIG. 5A. The proportions of each color RP0-RP7 are shown directly below the reference color proportions portion of Table A.

For samples located closer to the center of the map shown in FIG. 2, the reference and intermediate color samples will also have proportions of gray. Other intermediate color samples will have other combinations of reference colors. In all cases, the proportions of all reference colors which comprise an intermediate color (or a reference color) will add to 100%. The data shown in FIG. 3 and Table A is a rounded-off representation of the proportion and reflectance data actually used by the system, which may be carried to several decimal places for greater accuracy.

Among the characteristics generated are the spectrophotometric characteristics of each intermediate color sample. The spectrophotometric data is generated at each wavelength for which there is a reflectance value for the reference colors. The reflectance value for each intermediate color sample is derived by weighting the reflectance values for each reference color at the same wavelength.

For example, as shown in part in FIG. 3 (at the reference color stored data means 20) and more fully in Table A, at 400 nanometers the RP0 reflectance is 35.25 units and the RP7 reflectance is 67.24 units. The difference between these numbers, 31.99, is divided by 7 to derive the 4.57 unit difference in the 400 nanometer reflectance for each sample RP0-RP7. This difference is shown by the successive reflectance values for each color sample at the 400 nanometer wavelength.

Similar results are achieved by weighting the reference color reflectances at the 400 nanometer wavelength according to the relative proportions of those reference colors represented by each respective intermediate color. Thus, RP1's reflectance (comprised of 86% RP0 and 14% RP1, approximately) at 400 nanometers is approximately equal to the sum of 86%×35.25 and 14%×67.24, or 39.82, units.

The above process may be used to generate the reflectance value for each wavelength for which data exists for the reference colors. The process is shown at step 140 in FIG. 5A. The process is also repeated for each intermediate color RP1–RP6.

A similar process of calculating data may be used to generate tristimulus (XYZ) values. As for the reflectance values at each wavelength, the XYZ values are weighted in accordance with the reference color XYZ values. This process is shown by steps 150 and 160 in FIGS. 5A and 5B. However, the L*a*b* characteristics are not generated in this manner. Instead, they are derived from the photometric or XYZ characteristics of each intermediate color, using transformations or other stored information. The process is indicated by step 170 in FIG. 5B. Thus, the described process generates color sample data in the L*a*b* geometry which is proportionate to the more objective color description of photometric or tristimulus characteristics, yet readily describes each sample's L*a*b* values. Although other transformations or color characteristic data are not described herein, it is clear from the description that, through stored transformations or other data, other characteristics of colors (e.g. Munsell notations) may also be generated.

The characteristics of intermediate color samples may be generated between reference colors and previously-generated intermediate color sample characteristics or between two intermediate color samples. Such additional color sample characteristics are generated using the above-described process or its equivalent, using the color samples between which the sample to be generated would be located on the map shown in FIG. 2. Thus, an unlimited set of color sample characteristics can be generated from a limited set of reference color characteristics data.

With the above-described notation system, colors not represented in the generated data can be accurately and easily described. For example, based on the data shown in FIG. 4 and Table A, a color may be designated as RP2.4. The spectrophotometric, XYZ, L*a*b*, and any other desired characteristics of such a designated color may be readily generated by a processing system similar to a processing system which would generate the intermediate color characteristics as described above. The RP2.4 description indicates a weighting of 60% RP2 and 40% RP3. The photometric and tristimulus characteristics of the RP2.4 sample may be generated in accordance with this weighting. Other characteristics, such as L*a*b* characteristics, may also be derived by transformations or similar methods. Thus, even colors not expressly described by the set of reference and intermediate color sample characteristics can be intuitively described by the user in an accurate manner without an actual color sample or previously-generated characteristics data corresponding to the selection.

The color sample processing and generating system and method described herein is also readily adaptable to accurate color matching. Colors can be accurately matched in a number of ways. For example, use of reference colors corresponding to the colors available for mixing to generate intermediate color samples will enable a close match of a selected color. RP2, for example, may be achieved by mixing about 71% of the red reference color with about 29% of the purple reference color. In this manner, even hybrid colors, which may be selected by a user and not shown by the color notation system or samples generated thereby, e.g. a sample designated RP2.4 based on the data shown in FIG. 3, can be matched in an equally accurate manner. Thus, an infinite number of colors can be accurately described and matched from a limited number of reference colors.

The above-described process may be performed using a system such as that shown in FIG. 3. The color characteristics of the reference colors are stored in data storage means 20 by way of random access memory or the like. The number of samples to be generated is input into the system by input/output means 28, for example a video terminal having a keyboard. This input is stored in storage means, which may also be random access memory such as storage means 20, but are shown separately as storage means 22 for clarity. The central processing unit (CPU) 24 is under the control of software 80 shown stored in storage means 20 or, alternatively, in CPU 24. Software 80 represents the control instructions for executing the instructions indicated in the flowcharts shown in FIGS. 5A and 5B. The CPU may process the stored data to generate the characteristics of each intermediate color, which is shown as stored at storage location 58 for example.

Figure 5B:
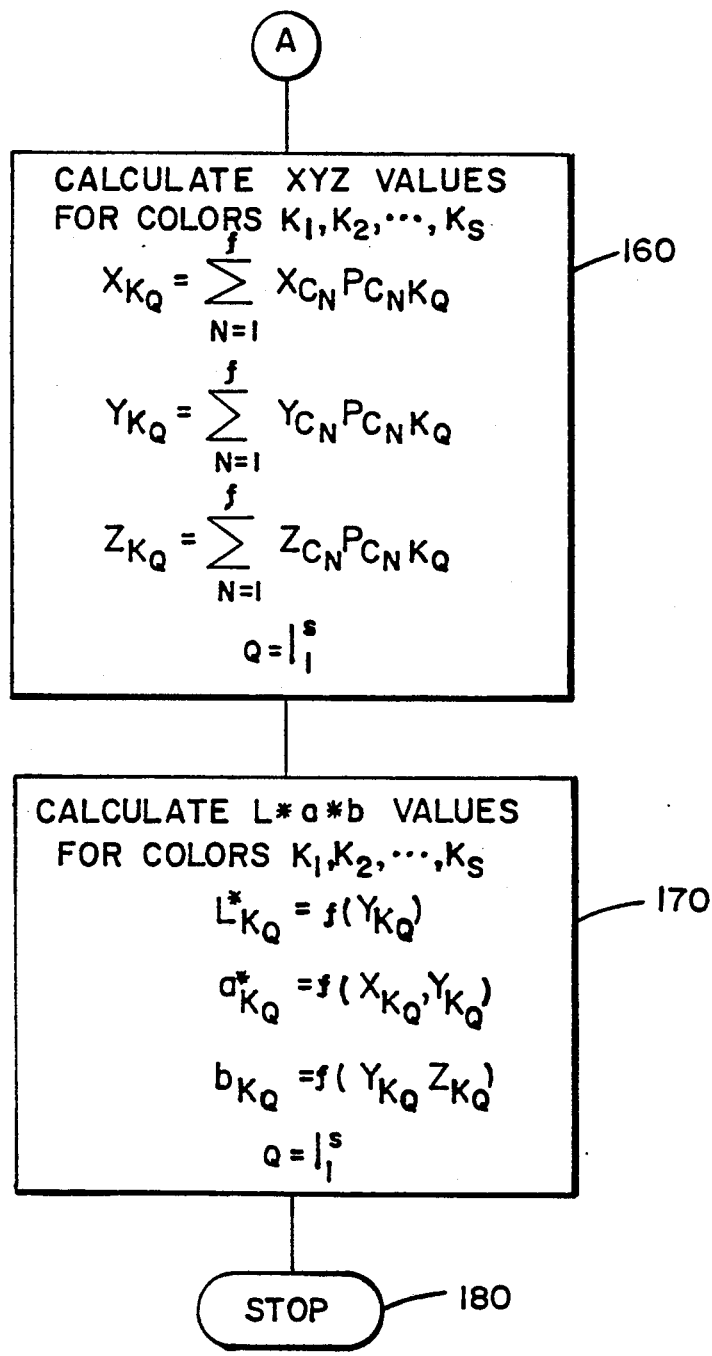

The steps performed by the software-controlled processing means used to generate color samples in accordance with the present invention are shown at their most basic level in the flowcharts shown in FIGS. 5A and 5B. The system starts by accessing the selected number of reference colors to be used to generate the intermediate colors, designated by the symbol f. This number will typically be 4 for a quadrilateral-shaped color chart. The system also accesses the number indicating the number of samples to be generated by the system, designated by the letter s. Finally, the system accesses the number of wavelength increments for which there is stored data for the reference colors, indicated by the letter v. This accessing step is indicated by step 110 of the flowchart.

The system also accesses the reflectance data for each reference color. Each piece of data stored in the storage means may be designated as shown by the designation $R_{C_N W_G}$. This symbol indicates a reflectance value for reference color $C_N$ at wavelength $W_G$. Thus, a complete set of this data will include integer values for N of between 1 and f, and for G between 1 and v, as shown at step 120.

Also shown, at step 130, is the step of generating the relative proportions of each reference color which comprise a given sample to be generated. These values are stored in a matrix with each value represented by the symbol $P_{C_N K_G}$. This designation represents the proportion of reference color $C_N$ for color sample $K_G$ to be generated. Thus, the P values will be generated for integer values of N ranging from 1 to f and for values of G ranging from 1 to s.

The accessed reflectance data and generated reference color proportion data is utilized at step 140 to generate the reflectance values at each wavelength for each color sample to be generated. As stated above, the reflectance value at a particular wavelength for a particular color to be generated will equal the sum of the products of the relative proportions of each reference color and the reflectance value for that reference color. This summation process is described by the equation shown in step 140.

The tristimulus, or XYZ values, may be generated in a similar manner. Step 150 shows the accessing of the tristimulus data for the reference colors. $X_{C_n}$, $Y_{C_n}$ and $Z_{C_N}$ represent the X, Y and Z values, respectively of reference color CN.

The XYZ values for each color to be generated, as for the reflectance values, is defined by the summation of a product of the characteristic values for each reference color and the relative proportion of the reference color which comprises the color to be generated. These summations for each characteristic, X, Y, and Z, are shown in the equations described in step 160.

Finally, the $L^*a^*b^*$ values for each color to be generated may be calculated based on the XYZ values. As indicated in step 170, the $L^*$ value for a given color sample to be generated, KQ, is a function of the Y-value of that generated color sample. The $a^*$ value of that color sample is a function of the X and Y values of that color sample, and the $b^*$ value is a function of the Y and Z values of that color sample.

TABLE A is an example of a set of data generated in accordance with the present invention. The four reference colors red, purple, gray, and blue are listed across the top of the chart with their corresponding percentages. Based on these percentages and the stored data for the reference colors, characteristics for each intermediate color are generated.

TABLE A

ADDITIVE REFLECTANCE DATA AND L*a*b CALCULATIONS
REFERENCE COLOR PROPORTIONS

| SAMPLE CODE<br>WAVELENGTH<br>(nm) | 100% RED<br>0% PURPLE<br>0% GRAY<br>0% BLUE<br>RP0 | 86% RED<br>14% PURPLE<br>0% GRAY<br>0% BLUE<br>RP1 | 71% RED<br>29% PURPLE<br>0% GRAY<br>0% BLUE<br>RP2 | 57% RED<br>43% PURPLE<br>0% GRAY<br>0% BLUE<br>RP3 |
|---|---|---|---|---|
| | | REFLECTANCES | | |
| 400 | 35.25 | 39.82 | 44.39 | 48.96 |
| 420 | 51.92 | 56.66 | 61.41 | 66.15 |
| 440 | 45.70 | 51.48 | 57.27 | 63.04 |
| 460 | 28.90 | 35.66 | 42.43 | 49.19 |
| 480 | 11.98 | 18.27 | 24.55 | 30.84 |
| 500 | 5.89 | 10.45 | 15.00 | 19.56 |
| 520 | 9.13 | 11.58 | 14.04 | 16.49 |
| 540 | 13.37 | 13.69 | 14.01 | 14.33 |
| 560 | 25.17 | 23.79 | 22.41 | 21.03 |
| 580 | 52.46 | 49.62 | 46.79 | 43.95 |
| 600 | 76.14 | 72.53 | 68.93 | 65.32 |
| 620 | 85.67 | 81.92 | 78.16 | 74.41 |
| 640 | 90.11 | 86.53 | 82.95 | 79.37 |
| 660 | 92.11 | 88.66 | 85.22 | 81.77 |
| 680 | 90.74 | 87.13 | 83.53 | 79.93 |
| 700 | 89.41 | 85.66 | 81.91 | 78.16 |
| X | 51.95 | 51.04 | 50.13 | 49.22 |
| Y | 34.05 | 34.05 | 34.05 | 34.05 |
| Z | 36.56 | 42.93 | 49.29 | 55.66 |
| L* | 65.00 | 65.00 | 65.00 | 65.00 |
| a* | 59.98 | 57.57 | 55.14 | 52.67 |
| b | 0.00 | −7.67 | −14.62 | −21.00 |

| SAMPLE CODE<br>WAVELENGTH<br>(nm) | 43% RED<br>57% PURPLE<br>0% GRAY<br>0% GRAY<br>RP4 | 29% RED<br>71% PURPLE<br>0% GRAY<br>0% GRAY<br>RP5 | 14% RED<br>86% PURPLE<br>0% GRAY<br>0% BLUE<br>RP6 | 0% RED<br>100% PURPLE<br>0% GRAY<br>0% BLUE<br>RP7 |
|---|---|---|---|---|
| | | REFLECTANCES | | |
| 400 | 53.53 | 58.10 | 62.67 | 67.24 |
| 420 | 70.90 | 75.64 | 80.38 | 85.13 |
| 440 | 68.83 | 74.61 | 80.40 | 86.18 |
| 460 | 55.96 | 62.72 | 69.49 | 76.25 |
| 480 | 37.13 | 43.41 | 49.70 | 55.99 |
| 500 | 24.12 | 28.68 | 33.23 | 26.30 |
| 520 | 18.94 | 21.39 | 23.85 | 37.79 |
| 540 | 14.64 | 14.96 | 15.28 | 15.60 |
| 560 | 19.64 | 18.26 | 16.88 | 15.50 |
| 580 | 41.11 | 38.27 | 35.44 | 32.60 |
| 600 | 61.72 | 58.11 | 54.51 | 50.90 |
| 620 | 70.65 | 66.90 | 63.14 | 59.39 |
| 640 | 75.79 | 72.21 | 68.64 | 65.06 |
| 660 | 78.32 | 74.87 | 71.43 | 67.98 |
| 680 | 76.32 | 72.71 | 69.11 | 65.51 |
| 700 | 74.42 | 70.67 | 66.92 | 63.17 |
| X | 48.30 | 47.39 | 46.48 | 45.57 |
| Y | 34.05 | 34.05 | 34.05 | 34.05 |
| Z | 62.03 | 68.40 | 74.76 | 81.13 |
| L* | 65.00 | 65.00 | 65.00 | 65.00 |
| a* | 50.18 | 47.65 | 45.09 | 42.49 |

TABLE A-continued
ADDITIVE REFLECTANCE DATA AND L*a*b CALCULATIONS
REFERENCE COLOR PROPORTIONS

| b | −26.91 | −32.42 | −37.60 | −42.50 |
|---|--------|--------|--------|--------|

Color sample identifiers or codes may also be generated by the processing unit as shown at storage locations 50, 52, 54, and 56, shown in FIG. 3. The generated data may be outputted at the with the input means. The generated data may also be stored in storage means 26.

The system is best utilized with an actual color chart having samples created as a result of the characteristic data generated and having sample identifiers or codes representative of the proportion of the reference colors used to generate the samples. FIG. 4 shows a representative portion of a color chart 30 set in the L*a*b* geometry, L*=constant, having color samples generated from the data shown in FIG. 3 corresponding to the RP0, RP1 ..., RP7 identification system (32, 34, 36, 38, 40, 42, 44 and 46, respectively). With color samples having equal areas as is typical, the location of each sample on the color chart may not exactly correspond to the equivalent relation between the color sample and the center axis of the L*a*b* plane as shown. However, the sample will be accurately positioned relative to all other samples.

Moreover, even when the color samples are not available for matching or have faded or are otherwise no longer accurate representations of the colors, the system enables matching which minimizes metamerism. Every color sample identifiable by the system is readily describable by its spectrophotometric characteristics. Computer or other processing of the spectrophotometric characteristics of the colors available for mixing may ensure a close match between the desired and actual spectrophotometric characteristics which will minimize metamerism.

The system may generate color samples readily identifiable in the L*a*b* system, and thus can accurately present colors to users in the L*a*b* geometry. Other advantages of the system should be clear from the description.

I claim:

1. A method for generating characteristics of a set of colors comprising the steps of:
   (a) selecting at least two reference colors;
   (b) describing each of the selected reference colors by a set of color characteristics data indicating a reflectance value of each color at each of a set of predetermined wavelengths; and
   (c) generating descriptions of intermediate color samples by:
      (i) selecting at least two base colors for which a set of color characteristics data is available;
      (ii) selecting a number of intermediate colors to be identified by color characteristics data based on the relative proportions of the selected base colors;
      (iii) computing relative proportions of each said selected base color which characterizes each intermediate color to be described; and
      (iv) generating color characteristics data including a reflectance value at each predetermined wavelength for each intermediate color sample which is proportionate to the sum of the product of each reflectance value for each base color at each corresponding wavelength and the relative proportion computed for each base color, for each intermediate color being described.

2. The method of claim 1 wherein the step of selecting reference colors further includes the selection of reference colors having equal L* values.

3. The method of claim 1 further comprising the steps of:
   (d) describing each of the selected reference colors by a set of color characteristic data further including data indicating tristimulus values of each color; and
   (e) generating tristiumuls values for each intermediate color which are proportionate to the tristimulus values of each base color, and the relative weight to be given each base color, for each intermediate color being described.

4. The method of claim 3 further comprising the steps of:
   (f) selecting a set of base colors different from each set of base colors previously selected;
   (g) describing the selected different set of base colors by a set of color characteristics data indicating the reflectance of each color at each of a set of predetermined wavelengths and by data indicating the tristimulus values of each color;
   (h) repeating the step of generating descriptions of each intermediate color sample, using the newly-selected set of base colors; and
   (i) repeating the step of selecting a different set of base colors until a desired set of intermediate color sample characteristics data is generated.

5. The method of claim 1 further comprising the steps of:
   (d) selecting a set of base colors different from any set of base colors previously selected;
   (e) describing the selected different set of base colors by a set of color characteristics data indicating the reflectance of each color at each of a set of predetermined wavelengths;
   (f) repeating the steps of generating descriptions of each intermediate color sample, using the newly-selected set of base colors; and
   (g) repeating the step of selecting a different set of base colors until all sets of intermediate color sample characteristics data to be generated have been generated.

6. The method of claim 1 further comprising the step of calculating the L*a*b* values for each intermediate color from the color characteristics data generated for each intermediate color.

7. The method of claim 1 wherein the reference colors are selected from the following colors: gray, red, yellow, orange, green, blue, yellow-green, blue-green, and purple.

8. The method of claim 7 wherein the number of reference colors selected is four.

9. The method of claim 1 or 2 or 3 or 5 or 4 or 6 or 7 or 8 further comprising the step of mixing portions of colorants representing each of a selected group of colors in proportions corresponding to the portions of each color in the selected group of colors which, when combined, have photometric characteristics similar to the color sample to be generated.

10. A set of color samples arranged in a two-dimensional plane correspondign to a L*a*b* color system, wherein L is constant, generated by the following steps:
   (a) selecting at least two reference colors;
   (b) describing each of the selected reference colors by a set of color characteristics data including reflectance data indicating reflectance of each color at each of a set of predetermined wavelengths;
   (c) generating descriptions of intermediate color samples by:
      (i) selecting at least two base colors for which a set of color characteristics data is available;
      (ii) selecting a number of intermediate colors to be identified by color characteristics data based on relative proportions of the selected base colors;
      (iii) calculating the relative proportion of each base color which characterizes each intermediate color to be described; and
      (iv) generating reflectance data for each predetermined wavelength for each intermediate color which are proportionate to the reflectance values for each base color at each corresponding wavelength and the relative proportion to be given each base color, for each intermediate color being described; and
   (d) generating a set of color samples corresponding to the color identified by the generated data, including the steps of:
      (i) mixing portions of colorants representative of each selected base color in proportions corresponding to the portions of the base colors represented by the color sample for each color sample to be generated;
      (ii) locating each color sample and the L*a*b* plane at a location generally corresponding to its relative location between an approximate, appropriate location for each base color from which the color sample data was generated, the color of the color sample representing the color mixed in the set of mixing portions of each selected base color.

11. The set of color samples in accordance with claim 10 further including labels for each color sample corresponding to a set of color characteristics data corresponding to the characteristics of the color sample generated.

12. The set of color samples in accordance with claim 11 further comprising labels corresponding to each color sample having codes representative of the proportion of each base color represented by the color sample.

13. A system for generating color sample data comprising:
   (a) first storage means for storing photometric characteristics of a set of reference colors and for storing data indicative of a number of intermediate colors to be generated;
   (b) central processing means electrically interconnected with the first storage means, a second storage means, and an output means and under software control for:
      (i) accessing the data stored in the first storage means;
      (ii) computing proportions of each reference color comprising each intermediate color for which reflectance data is to be generated; and
      (iii) computing reflectance data at each wavelength for which reference color photometric characteristics are stored in said first storage means for each intermediate color;
   (c) second storage means electrically interconnected with the central processing means and output means for storing the reflectance data computed for each intermediate color; and
   (d) output means for accessing and outputting the data stored in said second storage means.

14. The system in accordance with claim 13 wherein the central processing means further comprises means for generating color sample codes for each set of color characteristics for each color sample for which data is to be generated, said codes indicative of the relative proportions of each reference color which comprise each color sample identified by each code and providing said color sample codes to the output means; said outptu means further comprising means for outputting color sample codes such that each color sample code outputted corresponds to a set of color characteristics data generated by the central processing means outputted at said output means.

15. The system in accordance with claim 14 wherein the second storage means further comprises storage means for storing the color sample codes generated and providing said stored color sample codes to said output means.

16. The system in accordance with claim 15 wherein the central processing means is further under software control for calculating tristimulus values of each intermediate color.

17. The system in accordance with claim 13 wherein the first storage means further comprises means for storing tristimulus values of a set of reference colors.

18. The system in accordance with claim 17 wherein the central processing means is further under software control for generating L*a*b* values for each color sample having stored characteristics.

19. The system in accordance with claim 18 further comprising means for storing the L*a*b* value generated and providing said stored L*a*b* values to said output means.

20. A method of matching a color indicated by a color sample code to a mixture of a set of reference colors comprising the steps of:
   (a) identifying the color sample by a color sample code indicative of a particular set of data indicating a proportion of each set of reference color photometric characteristics data used to generate the color characteristics of the indicated color sample;
   (b) obtaining mixable quantities of reference colorants corresponding to the reference colors used to generated the color characteristics data corresponding to the color sample code; and
   (c) mixing the mixable quantities of reference colorants in the proportion indicated by the data identifying the proportions of each reference color characteristics data set used to form the color sample identified by the color sample code.

21. The method as in claim 20 further comprising the steps of:
   (d) storing the data indicating the proportion of each of said set of reference colors whose characteristics data was processed to generate the colored characteristics data of the color sample indicated by the color sample code; and
   (e) accessing the storage data represented by the color sample code to identify the proportion of each reference color used to generate the color characteristics data of the color sample identified by the color sample code.

* * * * *

UNITED STATES PATENT AND TRADEMARK OFFICE
CERTIFICATE OF CORRECTION

PATENT NO. : 5,012,431

DATED : April 30, 1991

INVENTOR(S) : Ralph Stanziola

It is certified that error appears in the above-identified patent and that said Letters Patent is hereby corrected as shown below:

Title page, the assignee "Colwell/General, Inc." should be --Colwell Industries, Inc.--

In the Abstract, line 16, the word "samples" should be --sample--.

Column 1, line 47, "L*a*b" should be --L*a*b*--.

Column 1, line 48, "L*a*b" should be --L*a*b*--.

Column 1, line 50, after the word "has" change the "," to --;--.

Column 1, line 52, "+a, +b" should be --±a, ±b--.

Column 1, line 53, "a*, and b" should be --a*, and b*--.

Column 1, line 56, "+a*, +b" should be --±a*, ±b*--.

Column 1, line 57, "+b" should be --+b*--; and "-b" should be ---b*--.

Column 1, line 65, "L*a*b" should be --L*a*b*--.

Column 1, line 66, "L*a*b" should be --L*a*b*--.

Column 2, line 7, "L*a*b" should be --L*a*b*--.

Column 2, line 10, "L*a*b" should be --L*a*b*--.

Column 2, line 45, after the word "for" insert --generating the--.

Column 2, line 61, "L*a*b" should be --L*a*b*--.

Column 2, line 63, "L*a*b" should be --L*a*b*--.

UNITED STATES PATENT AND TRADEMARK OFFICE
CERTIFICATE OF CORRECTION

PATENT NO. : 5,012,431

DATED : April 30, 1991

INVENTOR(S) : Ralph Stanziola

It is certified that error appears in the above-identified patent and that said Letters Patent is hereby corrected as shown below:

Column 5, line 37, after "tics" insert --,--.

Column 5, line 50, after the word "a" delete the numeral --5--.

Column 6, line 7, after the word "colors" delete the comma.

Column 6, line 14, after the word "performed" delete the numeral --5--.

Column 8, line 6, after the word "KQ" delete the comma.

Column 8, line 16, after the word "colors" delete the comma.

Column 8, Table A, line 2, "Additive Reflectance Data and L*a*b Calculations" should be --Additive Reflectance Data and L*a*b* Calculations--.

Column 8, Table A, line 33, "b" should be --b*--.

Column 9, Table A, line 2, "Additive Reflectance Data and L*a*b Calculations" should be --Additive Reflectance Data and L*a*b* Calculations--.

Column 10, line 17, "tristiumuls" should be --tristimulus--.

Column 10, line 24, "(f)" should be --(d)--.

Column 10, line 26, "(g)" should be --(e)--.

Column 10, line 24, "each" should be --any--.

Column 10, lines 29-30, after the word "wavelengths" delete --and by data indicating the tristimulus values of each color--.

UNITED STATES PATENT AND TRADEMARK OFFICE
CERTIFICATE OF CORRECTION

PATENT NO. : 5,012,431

DATED : April 30, 1991

INVENTOR(S) : Ralph Stanziola

It is certified that error appears in the above-identified patent and that said Letters Patent is hereby corrected as shown below:

Column 10, line 31, "(h)" should be --(f)--, and the word "step" should be --steps--.

Column 10, line 34, "(i)" should be --(g)--, and the word "step" should be --steps--.

Column 10, line 36, "a desired set" deleted and replaced with the phrase --all sets--.

Column 10, line 36, delete "is generated" and insert therefor --to be generated have been generated--.

Column 10, line 39, "(d)" should be --(f)--, and the word "any" should should be --each--.

Column 10, line 41, "(e)" should be --(g)--.

Column 10, line 44, after the word "wavelengths" insert --and by data indicating the tristimulus values of each color--.

Column 10, line 45, "(f)" should be --(h)--.

Column 10, line 48, "(g)" should be --(i)--.

Column 10, line 49, "all sets" should be --a desired set--.

Column 10, line 50, delete "to be generated have been" and insert therefor --is--.

Column 11, line 2, "correspondign" should be --corresponding--.

UNITED STATES PATENT AND TRADEMARK OFFICE
CERTIFICATE OF CORRECTION

PATENT NO. : 5,012,431
DATED : April 30, 1991
INVENTOR(S) : Ralph Stanziola It is certified that error appears in the above-identified patent and that said Letters Patent is hereby corrected as shown below:

Column 12, line 15, "outptu" should be --output--.

Column 12, line 17, "outputted" should be --output--.

Column 12, lines 18-19, "outputted" should be --output--.

Signed and Sealed this

Twentieth Day of October, 1992

*Attest:*

DOUGLAS B. COMER

*Attesting Officer*      *Acting Commissioner of Patents and Trademarks*